April 7, 1953 P. R. JOSEPH 2,634,367

ANGULAR VELOCITY MODULATION DETECTOR

Filed Aug. 25, 1949

PERRY R. JOSEPH
*INVENTOR.*

BY Francis W. Crotty
HIS ATTORNEY

Patented Apr. 7, 1953 2,634,367

UNITED STATES PATENT OFFICE 2,634,367

ANGULAR VELOCITY MODULATION DETECTOR

Perry R. Joseph, Zion, Ill., assignor to The Rauland Corporation, a corporation of Illinois Application August 25, 1949, Serial No. 112,328

5 Claims. (Cl. 250—27)

This invention relates to an improved angular-velocity modulation detector. While the invention is of general application, it has particular utility as the detector of a carrier-signal receiver and will be described in that connection. In the specification and in the appended claims, the term "angular-velocity modulation" is used generically to refer to either a frequency or a phase-modulated carrier signal.

The angular-velocity modulation detectors heretofore employed in the art utilize a plurality of circuit components including a condenser connected in parallel with the load impedance of the detector. It is, of course, well recognized that the impedance of a shunt condenser decreases with frequency so that the shunt condenser in detectors of the type under consideration tends to short-circuit the load impedance during the operating intervals in which the frequency deviation of the received signal causes the instantaneous frequency to be high. This shunting effect and its variation with frequency impairs the frequency response characteristic which it is desired that the detector exhibit. Furthermore, in one type of prior detector, a stabilizing condenser having a capacitance of at least several micro-microfarads is required and it is quite desirable that the detector circuit omit as many such components as possible in order that the production cost may be minimized.

It is an object of the present invention, therefore, to provide an improved angular-velocity modulation detector which avoids one or more of the afore-mentioned limitations of prior systems.

It is a further object of the invention to provide an angular-velocity modulation detector which has an improved frequency-response characteristic.

It is a specific object of the invention to provide an angular-velocity modulation detector which is simple and inexpensive to construct.

In accordance with the invention, an angular-velocity modulation detector comprises first and second rectifier devices individually including an anode and a cathode. An input circuit for the detector includes an impedance network connected between the anode of the first rectifier device and the cathode of the second device for applying thereto, in phase opposition, a signal to be detected. The input circuit also includes a connection between the electrical center of the impedance network and a plane of fixed reference potential for supplying a signal to the rectifier devices in like phase. The detector additionally comprises a substantially resistive load impedance having one terminal coupled to the cathode of the first rectifier device and to the anode of the second rectifier device and having a second terminal coupled to the plane of reference potential. Consequently, across the load impedance there is developed a signal the amplitude of which varies with the phase relation of the signals applied to the rectifiers.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figures 1, 2, 3, 4:
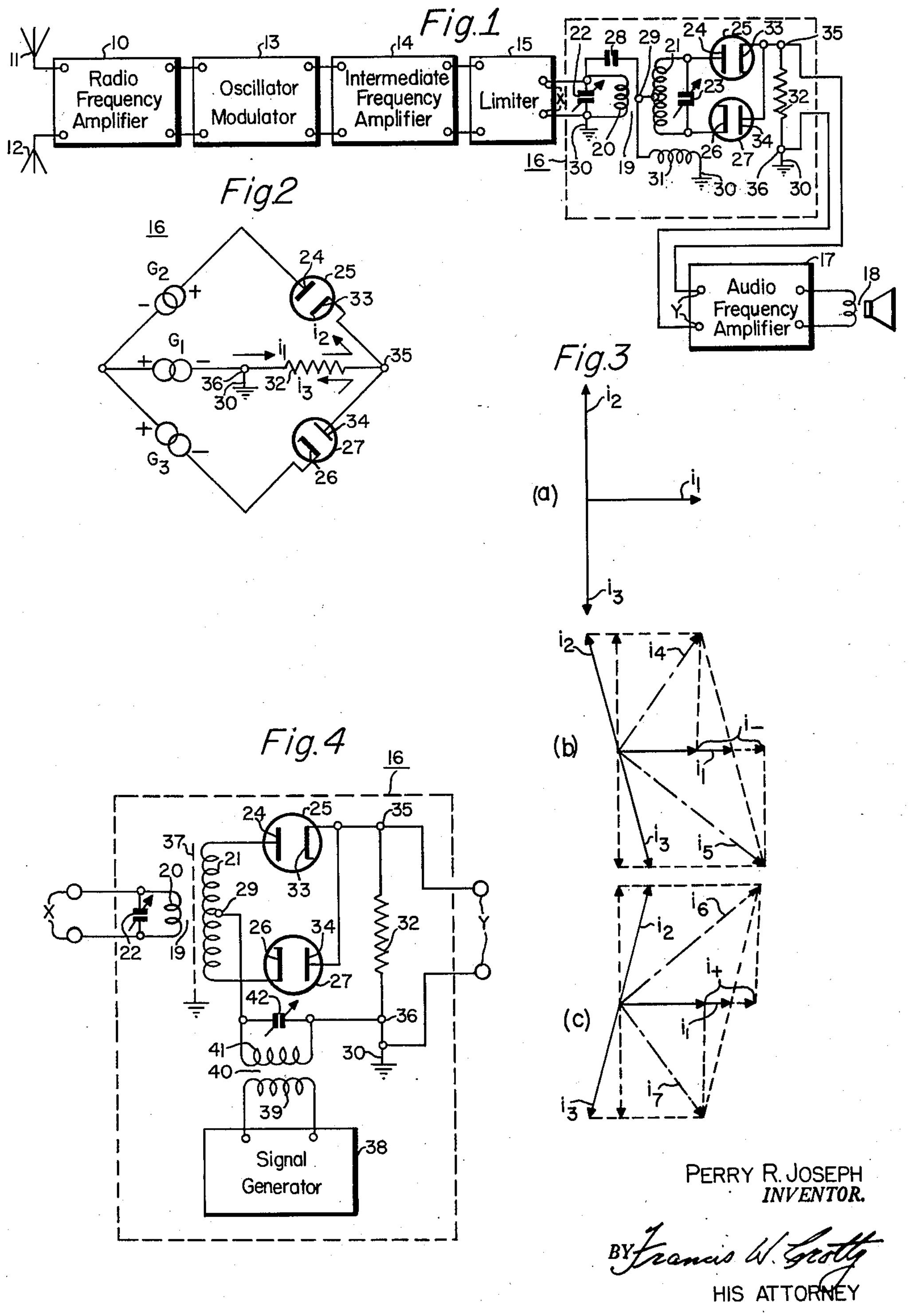
Fig. 1 is a circuit diagram, partly schematic, of a complete frequency-modulated carrier signal of the superheterodyne type including an angular-velocity modulation detector embodying the present invention.
Fig. 2 is a simplified circuit diagram of the portion of Fig. 1 embodying the present invention.
Fig. 3 is a series of vector diagrams representing certain operating characteristics of the circuit of Fig. 1.
Fig. 4 is a circuit diagram of a modification of the arrangement of Fig. 1.

Referring to Fig. 1, the receiver there represented includes a radio-frequency amplifier 10, of one or more stages, having its input circuit connected to an antenna system 11, 12 and having its output connected to an oscillator-modulator 13. Connected in cascade with the oscillator-modulator, in the order named, are an intermediate-frequency amplifier 14 having one or more stages of amplification, a limiter 15, an angular-velocity modulation detector 16 constructed in accordance with the invention as will be pointed out more fully hereinafter, an audio-frequency amplifier 17 of one or more stages, and a sound reproducer 18.

It will be understood that the various units just described, with the exception of detector 16, may be of a conventional construction and operation, the details of which are known in the art rendering a further detailed description thereof unnecessary. Considering briefly the operation of the receiver as a whole and neglecting for the moment the detailed operation of detector 16, presently to be described, the desired frequency modulated carrier-signal is selected and amplified by radio-frequency amplifier 10, converted to a frequency modulated intermediate-frequency carrier-signal in the oscillator-modulator 13, amplified in intermediate-frequency amplifier 14, amplitude limited in limiter 15, and detected by the frequency detector 16 thereby to derive the audio-frequency modulation components. The audio-frequency components are, in turn, amplified in the audio-frequency amplifier 17 and are reproduced by the sound reproducer 18 in a conventional manner.

Referring now more particularly to the portion of the system embodying the present invention, the frequency detector 16 comprises an input circuit including a transformer 19 having a primary winding 20 and a secondary winding 21. Primary winding 20 together with a parallel capacitor 22 is resonant at the mean intermediate frequency of the receiver and is connected with the output terminals X of limiter 15. A capacitor 23 connected in parallel with secondary 21 resonates the secondary circuit at the same frequency.

The secondary winding 21 is connected between the anode 24 of a first rectifier device 25 and the cathode 26 of a second rectifier device 27 for applying thereto, in phase opposition, a signal to be detected. Rectifier devices 25 and 27 are shown as vacuum tube diodes, but any unidirectionally conductive devices may be utilized. One terminal of primary winding 20 is connected through a capacitor 28, having a low impedance for intermediate-signal frequencies, to the electrical center 29 of secondary winding 21. The other terminal of primary winding 20' is connected to a plane 30 which is maintained at a fixed reference potential or at ground potential. A radio-frequency choke 31, having a high impedance at the intermediate frequency, is connected between the electrical center 29 of winding 21 and ground 30. By means of capacitor 28 a signal is applied to rectifier devices 25 and 27 in like phase.

A load impedance for the detector includes a resistive element 32 having one terminal 35 coupled to cathode 33 of rectifier 25 and to anode 34 of rectifier 27 and having a second terminal 36 coupled to the ground plane 30. The load impedance, therefore, derives a signal, the amplitude of which varies with the phase relation of the signals applied to rectifiers 25 and 27.

Referring now to Fig. 2, the simplified circuit diagram of detector 16 includes some of the identical elements shown in Fig. 1 which are represented by like reference numerals. The impedance networks of the input circuit have been represented by generators which function as follows: $G_1$ supplies the signals provided by primary winding 20 of transformer 19 between the electrical center 29 of winding 21 and ground 30; $G_2$ supplies signals induced into the upper half of secondary winding 21 by primary winding 20 of transformer 19; and $G_3$ represents a generator which supplies signals induced into the lower half of secondary winding 21 by winding 20. The indicated voltage polarities and arrows representing the resulting currents flowing in the circuit are for a particular instant of time. Consider for the moment polarities corresponding to an instant of time displaced by 180 electrical degrees from that shown. All polarities are reversed and it is apparent that there is no current flow in rectifier 25 due to source $G_2$ and there is no current flow in rectifier 27 due to source $G_3$. Current does flow, however, through diode 27 as a result of the voltage from source $G_1$ in a direction reverse to that illustrated by arrow $i_1$.

Consider now the instant of time represented in Fig. 2 and further consider that the input signal has a frequency equal to the mean of the range of frequencies over which incoming signals deviate. The current through load 32 and diode 25 resulting from the voltage of generator $G_1$ is $i_1$, being indicated by the horizontal vector of Fig. 3*a*. Source $G_2$ produces a current $i_2$ through diode 25, represented by the upwardly extending vector of Fig. 3*a*. As a result of the voltage of generator $G_3$, current $i_3$ flows through load 32 and diode 27 and is denoted by the downwardly extending vector. These phase relations are peculiar to the form of input circuit and are well understood. It may be seen that the vectors $i_2$ and $i_3$ are equal and opposite and produce no resulting component of current in the load 32. Vector $i_1$ remains but since it alternates through load 32 with time at the signal frequency rate no steady or slow component, compared with signal frequencies, is produced thereby.

Considering now Fig. 3*b*, let it be assumed that the signal frequency has deviated in a particular direction to a new frequency. Also, let it be assumed that as a result of this frequency shift, and relative to the representation of Fig. 3*a*, vector currents $i_2$ and $i_3$ are advanced in phase. This particular variety of phase shift is well understood and is attributable to the resonant circuit 21, 23. The vector sum of currents through diode 25 and the load 32 is $i_4$; shown as a dash-dot vector and the vector sum of currents through load 32 and diode 27 is denoted by the dash-dot vector $i_5$. It may be seen that vector $i_5$ is larger in magnitude than vector $i_4$. By resolving these vectors into their resistive and reactive components, it is further apparent that a resulting current flows in the load 32 which is predominantly due to the current through rectifier 27. This resultant is represented by $i-$. Since the current flowing through impedance 32 is mainly due to diode 27, the voltage drop produced thereby is of a polarity whereby terminal 35 is negative relative to terminal 36.

In Fig. 3*c* that condition of operation is illustrated wherein the signal frequency has shifted in a direction opposite to that described in connection with Fig. 3*b* to another new frequency. The vectorial additions are performed in the same manner as afore-described, and it may be seen that for this latter condition the current which flows in load 32 is predominantly due to diode 25. The resulting current, which is represented in Fig. 3*c* as $i+$, produces a voltage drop across the load 32 such that terminal 35 is positive relative to terminal 36.

Hence, an output voltage is established between terminals 35 and 36, the polarity of which varies with the direction of frequency deviation of the input signal relative to its mean value. From the discussion presented in connection with Figs. 2 and 3 it also may be seen that not only does the polarity of the output voltage vary with frequency, but the amplitude of the output signals varies with the amount or extent of frequency shift. Therefore, the required input frequency-output amplitude characteristic obtains to convert those frequency deviations of the received signal representing the transmitted intelligence into amplitude and polarity variations of the detected output signal.

In a particular example of the detector, load 32 has a resistive value of 5,000 ohms. Compared with the load impedance of prior systems, this value is relatively low and the stray capacitance of the input circuit of audio frequency amplifier 17, approximately 5 micro-microfarads, represents a very high impedance within the audible range of frequencies as well as for frequencies higher than the conventional range. Additionally, since, other than the audio amplifier input strays, there are no circuit elements which capacitively shunt load resistor 32, the frequency response deficiency of prior systems is avoided. It is apparent then, that the detector which has been described is capable of deriving modulation signal components over a much higher range of output frequencies than heretofore possible.

By a summary study of the detector circuit it readily may be seen that relatively few component elements are required as compared with prior devices and no large capacitances are needed. Thus, the circuit is inexpensive and simple to construct.

Fig. 4 is a circuit diagram of a portion of a complete signal carrier receiver which essentially is similar to that of Fig. 1, identical circuit elements being designated by like reference characters. This modification of the invention differs from that shown in Fig. 1 in that it is designed to derive modulation signal components from a carrier signal which is phase modulated. This detector may be employed in the receiver of Fig. 1 by connecting its input and output terminals X and Y with the terminals similarly designated in Fig. 1 and the remainder of the receiver of Fig. 1 operates in the manner afore-described. Instead of receiving a frequency-modulated signal the carrier signal receiver is adjusted to receive a signal having a given frequency and the phase of which deviates over a predetermined range.

In transformer 19 an electrostatic shield 37 is interposed between primary winding 20 and secondary winding 21 to preclude capacitive coupling therebetween. Also, secondary winding 21 is closely coupled with primary winding 20 and is untuned. Primary winding 20 together with capacitor 22 is resonant at the mean intermediate frequency of the receiver. A reference signal is applied to each of rectifiers 25 and 27 in like phase from a phase-reference signal generator 38. Generator 38 is coupled to the primary winding 39 of a transformer 40, the secondary winding 41, of which, is connected between the electrical center 29 of winding 21 and ground 30. Signal generator 38 supplies a reference signal having a frequency equal to the given frequency of the signal applied at terminals X and phased at the mean of the predetermined range of phase deviation. A capacitor 42 connected in parallel with secondary winding 41 tunes this circuit to the frequency of signal generator 38.

The operation of this embodiment of the invention essentially is similar to that of Fig. 1 and the detailed description made in connection therewith is applicable. Although the circuit of Fig. 4 is adapted for demodulating a phase modulated signal, the phase relations and vector conditions of Figs. 1 and 2 for a frequency modulated signal are the same, and a detailed analysis of Fig. 4 is deemed unnecessary.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. An angular-velocity modulation detector comprising: first and second rectifier devices individually including an anode and a cathode; an input circuit for said detector including an impedance network connected between said anode of said first device and said cathode of said second device for applying thereto, in phase opposition, a signal to be detected, and further including a connection between the electrical center of said network and a plane maintained at a fixed reference potential for supplying a signal to said devices in like phase; and a substantially resistive load impedance for said detector having one terminal coupled to said cathode of said first device and to said anode of said second device and having a second terminal coupled to said plane of reference potential for deriving a signal the amplitude of which varies with the phase relation of the signals applied to said devices.

2. An angular-velocity modulation detector for detecting a signal the frequnecy of which deviates with respect to a mean frequency comprising: first and second rectifier devices individually including an anode and a cathode; an input circuit for said detector including an impedance network, resonant at said mean frequency, connected between said anode of said first device and said cathode of said second device for applying said signal thereto in phase opposition and further including a connection between the electrical center of said network and a plane maintained at a fixed reference potential for supplying said signal to said devices in like phase; and a substantially resistive load impedance for said detector having one terminal coupled to said cathode of said first device and to said anode of said second device and having a second terminal coupled to said plane of reference potential for deriving a signal the amplitude of which varies with the frequency of the applied signal.

3. An angular velocity modulation detector for detecting a signal the frequency of which deviates with respect to a mean frequency comprising: first and second rectifier devices individually including an anode and a cathode; an input circuit for said detector including an impedance network resonant at said mean frequency, connected between said anode of said first device and said cathode of said second device for applying said signal thereto in phase opposition and further including a second impedance network connected between the electrical center of said first-mentioned network and a plane maintained at a fixed reference potential for supplying said signal to said devices in like phase; and a substantially resistive load impedance for said detector having one terminal coupled to said cathode of said first device and to said anode of said second device and having a second terminal coupled to said plane of reference potential for deriving a signal the amplitude of which varies with the frequency of the applied signal.

4. An angular velocity modulation detector comprising: first and second rectifier devices individually including an anode and a cathode; an input circuit for said detector including an impedance network connected between said anode of said first device and said cathode of said second device for applying thereto, in phase opposition, a signal having a given frequency and the phase of which deviates over a predetermined range; a phase-reference signal generator connected between the electrical center of said network and a plane maintained at a fixed reference potential for supplying a reference signal to said devices in like phase, said reference signal having a frequency equal to said given frequency and phased at the mean of said predetermined range; and a substantially resistive load impedance for said detector having one terminal coupled to said cathode of said first device and to said anode of said second device and having a second terminal coupled to said plane of reference potential for deriving a signal the amplitude of which varies with the phase relation of the signals applied to said devices.

5. An angular velocity modulation detector comprising: first and second rectifier devices individually including an anode and a cathode; an input circuit for said detector including a transformer having a primary winding, a secondary winding and an electrostatic shield interposed therebetween, said secondary winding being connected between said anode of said first device and said cathode of said second device for applying thereto, in phase opposition, a signal having a given frequency and the phase of which deviates over a predetermined range; a phase-reference signal generator connected between the electrical center of said network and a plane maintained at a fixed reference potential for supplying a reference signal to said devices in like phase, said reference signal having a frequency equal to said given frequency and phased at the mean of said predetermined range; and a substantially resistive load impedance for said detector having one terminal coupled to said cathode of said first device and to said anode of said second device and having a second terminal coupled to said plane of reference potential for deriving a signal the amplitude of which varies with the phase relation of the signals applied to said devices.

PERRY R. JOSEPH.

REFERENCES CITED

The following references are of record in the file of this patent:

UNITED STATES PATENTS

| Number | Name | Date |
|---|---|---|
| 2,377,327 | Seeley | June 5, 1945 |
| 2,463,685 | Fredendall | Mar. 8, 1949 |
| 2,473,790 | Crosby | June 21, 1949 |
| 2,489,262 | Buckbee | Nov. 29, 1949 |